March 12, 1957 — E. L. BYRKETT — 2,784,958
WEIGHING APPARATUS
Filed May 14, 1952
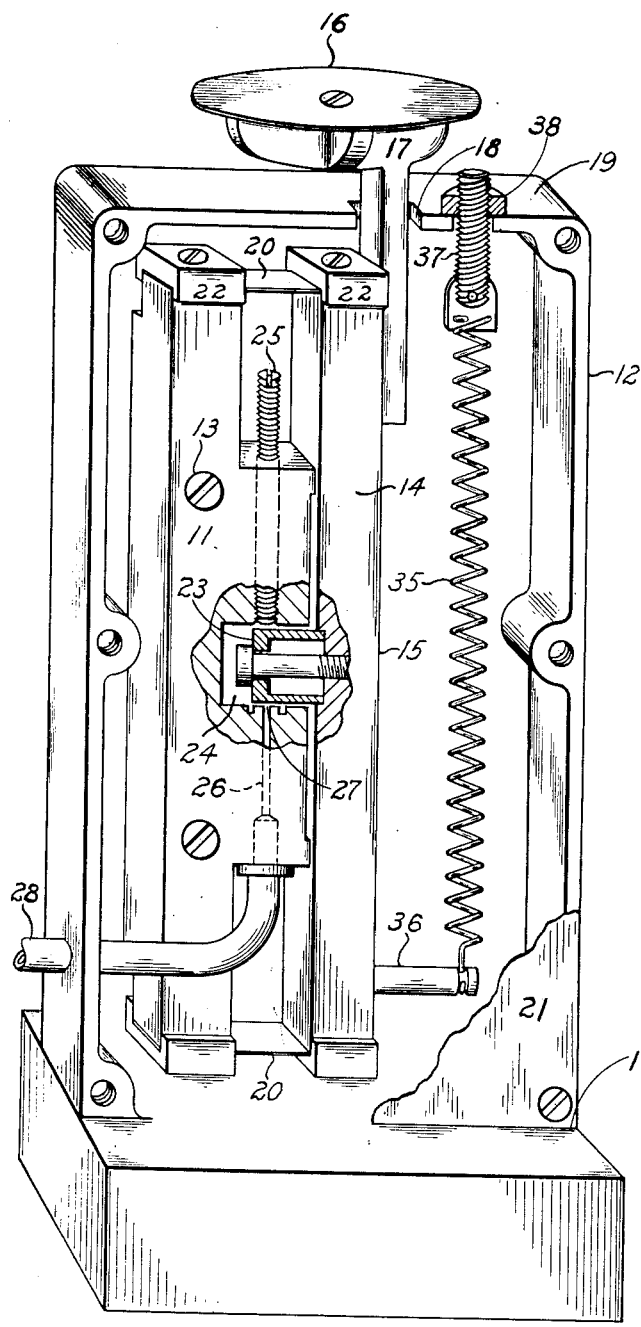
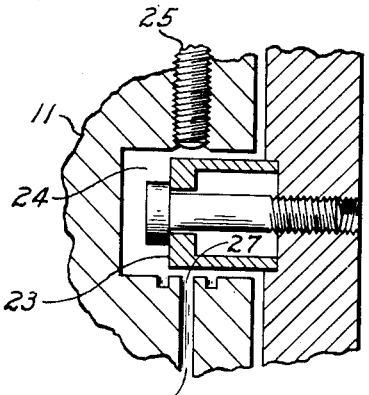
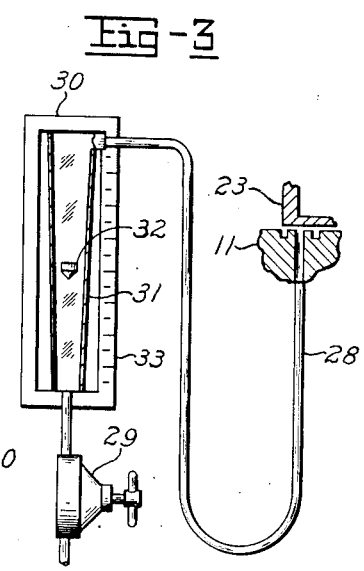
INVENTOR.
BY E. L. Byrkett
Edward J. Noriss
atty.

United States Patent Office 2,784,958
Patented Mar. 12, 1957

2,784,958

WEIGHING APPARATUS

Elwood L. Byrkett, Dayton, Ohio, assignor to The Sheffield Corporation, Dayton, Ohio, a corporation of Ohio Application May 14, 1952, Serial No. 287,731

1 Claim. (Cl. 265—63)

This invention relates to weighing apparatus and more particularly to apparatus for measuring or comparing a weight or force in which the weighing operation is performed by the measurement of air flow through an air orifice.

One object of the invention is the provision of weighing apparatus having a load carrying member and a support on which the load carrying member is so carried as to be capable of very limited movement, the position of the load carrying member being shown by a suitable indicator or the like which shows air flow taking place through an orifice.

Another object is the provision of a load carrying member mounted by means of a pair of parallel spring blades for rectilinear movement on a supporting member, one of the members having an air leakage orifice connected to a supply of air under pressure, the flow through the orifice being controlled by the other member.

Another object is the provision of weighing apparatus having a load carrying member and a supporting member with parallel spring blades mounting the load carrying member for rectilinear movement, there being an adjustable spring connected to the load carrying member acting in opposition to the load.

Other objects and advantages of the invention will be apparent from the following description, the appended claims, and the accompanying drawing, in which:

Fig. 1 is a perspective view of the weighing apparatus, portions being shown in section to show the operation of the gauging orifice;

Fig. 2 is an enlarged sectional view through the orifice and the abutment with which the orifice cooperates; and Fig. 3 is a diagrammatic view of the indicating device used in conjunction with the weighing apparatus.

Referring more particularly to the drawing in which the same reference numerals are applied to like parts in the different views, 10 generally designates a support including a housing structure 12 on a base member. Fixed to the rear wall of the housing structure is a supporting member or bar 11. This bar extends upwardly along the rear wall and is fastened to it by means of fastening screws 13. Extending parallel to the bar 11 is a load carrying member 14. This member includes a bar portion 15 to which is fixed the connecting arm 17 of a load carrying plate 16. Arm 17 extends down through an opening 18 in the top wall 19 of the housing. A removable front cover plate 21 closes the front of the housing.

The bar portion 15 is mounted for rectilinear movement by means of a pair of parallel spring blades 20. The upper blade is fixed at one end to the upper end of the supporting member 11 and fixed at its other end to the upper end of the bar portion 15 by means of suitable retaining caps 22. In a similar manner the lower spring blade 20 is fixed at one end to the lower end of the supporting member 11 and at its other end to the bar portion 15. The two spring blades, which are of the same length, carry the load carrying member for vertical movement. The amount of movement permitted the load carrying member is quite limited, however, since there is a projection 23 fixed on the load carrying member and operable in a recess 24 in the supporting member, the recess being only slightly larger than the projection. The amount of movement permitted the movable load carrying member is controllable by means of a screw 25 threaded in the supporting member 11 as shown in Fig. 1 and operable downwardly toward the upper horizontal flat face of the projection 23. Normally in operation there is some space, perhaps a few hundredths of an inch, provided between the lower end of the screw 25 and the upper side of the projection 23.

Arranged in the supporting member 11 is channel 26 terminating in an orifice 27 which faces the lower horizontal flat side of the projection 23. Air under pressure is supplied to the passage 26 by means of a conduit 28 and this air leaks out through the orifice 27 to a degree that depends on the space between the orifice and the lower side of the projection 23. This space is only several hundredths or possibly several thousandths of an inch when a position of balance is obtained in operation. For the supply of air, the conduit 28 is connected as shown in Fig. 3 to an air gauge of any suitable character connected in turn to a pressure regulating valve 29 that may be connected to the factory air supply line. As herein shown, the air gauge 30 comprises an upwardly extending tapered tube 31 containing a movable float 32 that assumes a position along the tube dependent upon the rate of air flow through the tube, the position of the float being shown by means of a graduated scale 33.

Acting in opposition to the load is a spring 35 connected at its lower end to a stud 36 on the load carrying member. The upper end of the spring is fixed to a screw 37 having an adjusting nut 38 which can be operated to raise or lower the upper end of the spring in order to adjust the projection 23 into a desired position in which it is slightly spaced above the orifice 27 and where it will also be spaced from the lower end of the adjusting screw 25. This is the position of balance assumed by the parts when a weight or force of known magnitude is applied to the scale plate 16. For example, if the device is to be used for comparing a number of parts applied to the scale in succession to a standard weight or part, the standard part is first applied to the scale plate 16 and the spring 35 adjusted by turning the nut 38 until a measurable indication is observed by noting the float level of the air gauge. The standard part is then removed from the scale plate and the parts to be measured then applied successively to the scale plate and each part is compared with the standard by noting the position of the float level. If the float level is maintained within an allowable tolerance range, the operator knows that the part weighed conforms with the particular tolerance requirements. Maximum and minimum masters or weights may be applied to the scale plate to determine the lower and the upper permissible positions of the float.

It will now be apparent that an exceedingly accurate measurement of the weight of a part applied to the scale plate 16 can be readily obtained and it will also be apparent that since the amount of movement permitted the scale plate in any weighing operation is very limited and of the order of only several hundredths or even several thousandths of an inch, the movable parts of the apparatus will not be subjected to oscillatory movements when the weight is applied. In other words, the movable parts of the mechanism instantly assume a weighing position of balance when the weight is applied and the operator does not need to wait for the parts to assume a stable position before making the actual measurement.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A weighing apparatus comprising a base, a pair of blocks, means mounting a first of said blocks on said base, means mounting the second of said blocks closely adjacent the first for movement parallel thereto, said mounting means including parallel spring blades connected between the blocks, said second block having a movable projection at one side thereof and the first block having a conforming recess closely receiving said projection, said first block having an air supply passage adapted for connection to a source of air under pressure and an air gauge terminating in an open orifice at one side of said recess in opposition to one side of said projection, whereby leakage through the orifice is controlled as the second block moves in weighing, an adjustable limiting screw in said first block in opposition to the other side of said projection within said recess, counterbalance means connected between the movable block and said base, and load applying means on said movable block.

References Cited in the file of this patent

UNITED STATES PATENTS

| | | |
|---|---|---|
| 2,470,427 | Brodie | May 17, 1949 |
| 2,486,052 | Moore | Oct. 25, 1949 |
| 2,523,564 | Fortier | Sept. 26, 1950 |
| 2,571,917 | Mennesson | Oct. 16, 1951 |
| 2,628,055 | Knobel et al. | Feb. 10, 1953 |
| 2,646,274 | Weckerly | July 21, 1953 |
| 2,649,294 | Walter | Aug. 18, 1953 |

FOREIGN PATENTS

| | | |
|---|---|---|
| 6,586 | Great Britain | May 30, 1885 |